June 1, 1971 J. M. THOMAS 3,581,398

DENTAL KEYING DEVICE

Filed Dec. 9, 1968 5 Sheets-Sheet 1

INVENTOR.
JOHN M. THOMAS

BY Cumpston, Shaw + Stephens

ATTORNEYS

June 1, 1971 J. M. THOMAS 3,581,398

DENTAL KEYING DEVICE

Filed Dec. 9, 1968 5 Sheets-Sheet 2

INVENTOR.
JOHN M. THOMAS

BY Cumpston, Shaw & Stephens

ATTORNEYS

June 1, 1971 J. M. THOMAS 3,581,398

DENTAL KEYING DEVICE

Filed Dec. 9, 1968 5 Sheets-Sheet 3

INVENTOR.
JOHN M. THOMAS

BY Cumpston, Shaw and Stephens

ATTORNEYS

June 1, 1971 J. M. THOMAS 3,581,398

DENTAL KEYING DEVICE

Filed Dec. 9, 1968 5 Sheets-Sheet 4

INVENTOR.
JOHN M. THOMAS

BY Cumpston, Shaw and Stephens

ATTORNEYS

June 1, 1971 J. M. THOMAS 3,581,398

DENTAL KEYING DEVICE

Filed Dec. 9, 1968 5 Sheets-Sheet 5

INVENTOR.
JOHN M. THOMAS

BY Crumpton, Shaw and Stephens

ATTORNEYS

United States Patent Office 3,581,398
Patented June 1, 1971

3,581,398
DENTAL KEYING DEVICE
John M. Thomas, Webster, N.Y., assignor to Thomas Technadent Products, Inc., Rochester, N.Y.
Continuation-in-part of application Ser. No. 696,301, Jan. 8, 1968. This application Dec. 9, 1968, Ser. No. 784,539
Int. Cl. A61c 13/00
U.S. Cl. 32—11 23 Claims

ABSTRACT OF THE DISCLOSURE

A dental model is cast on an arch-shaped ridge that has a key extending beyond the base of the model. The key has vertical corrugated walls that fit closely into a matrix so that the kewed model can be cut up and its parts inserted and removed from the matrix. The matrix is either made to fit the key or cast onto the key.

CROSS REFERENCE

This application is a continuation-in-part of my parent application, Ser. No. 696,301, filed Jan. 8, 1968, and now abandoned entitled Dental Model Keying Device and Construction Method.

BACKGROUND OF THE INVENTION

This invention relates to a device for making a dental model keyed to a matching matrix base and a method of constructing or working with such a model.

Dental crown and bridge work and other dental prostheses require intermediate models of the patient's teeth. A negative impression of the teeth is prepared in a known way, and the model is formed by pouring a casting material generally known in the trade as "stone" into the negative impression to form an accurate model of the teeth. The model is used in various known ways to construct a prosthesis for insertion into the patient's mouth.

The prosthesis preparation often requires that the model be cut or sectioned to separate various teeth, and sectioned pieces of the model must be accurately relocated and held in place relative to the other teeth as the work progresses so that the finished work will accurately fit the patient's mouth. Several devices have been suggested for holding parts of the model in place during these operations, but all of them have suffered various disadvantages. They have been expensive, inaccurate, awkward to use, unable to hold model parts firmly in an upper jaw mounted on an articulator, difficult to clean, easily clogged by bits of wax, stone, or other foreign bodies and generally inefficient.

As a result, the only method widely used in dental laboratories today is to bore holes from the bottom of the model into the teeth to be separated and to mount dowel pins for relocating such teeth. With such an arrangement, the dowel pin holes are difficult to drill accurately, and a tiny bit of wax or dust can clog a dowel pin hole to prevent accurate repositioning of the sectioned model part. Furthermore, any particles accidentally lodged in a dowel pin hole are very difficult to remove. Thus the dowel method is time consuming, difficult, and inaccurate.

The objects of this invention include, without limitation:

(a) A dental model keying device that insures accurate location of model parts at all times and in either upper or lower jaw orientation, is easy and convenient to manipulate, is easily cleaned, is not readily clogged or jammed by wax, stone, or other foreign bodies, is economically made and disposable after each use, reduces the time involved in model manipulation, increases the accuracy of the finished product and is competitive with previously known devices; and (b) A model preparation method that uses simple and inexpensive keying devices with no moving parts, requires only materials readily and economically available in dental laboratories, is speedy, efficient, and accurate, and is competitive with previously known methods.

These and other objects of the invention will be apparent hereinafter from the specification which describes the invention, its use, operation, and preferred embodiments, from the drawings, which constitute a part of the disclosure, and from the subject matter claimed.

The invention has evolved somewhat since filing the parent application, and experience with several variations of the inventive keying device has led to a preferred device selected for commercial exploitation. The preferred solution uses an upright ridge in an arch-shape that is cast into a dental model and shaped to interlock with the model to anchor the model securely on the ridge. The ridge strengthens the model and securely bonds a key to the model. The key is preferably integral with the ridges, extends beyond the base of the model, and has a keying surface that is vertical and corrugated. A matrix, either manufactured to fit the key, or cast onto the key, has a recess that closely fits the key so that sectioned model parts can be inserted frictionally held in the matrix for work on the model. The casting ridge, key and matrix can be formed in a variety of ways described below.

SUMMARY OF THE INVENTION

The inventive dental model keying device includes: a relatively narrow, upright ridge following the arched path of a dental arch and tall enough to extend from the base of the model to the gingival region of the model and shaped to interlock with the model; a key extending from the bottom of the ridge beyond the model base and having a keying surface that is vertical and generally corrugated; and a matrix closely fitting the key and dimensioned for a friction-fit with the key sufficient to hold keyed parts of the model during work on the model. The inventive method includes forming the matrix, casting the model on the ridge, sectioning the keyed model and inserting keyed model parts in the matrix for model work.

DETAILED DESCRIPTION

Throughout the specification and in the claims, the inventive keying device is referred to in the orientations illustrated, and references to top, bottom, upper, lower, above, below, and vertical, are merely for convenience since the inventive keying device can be, and is, turned in many orientations during its use.

The following description considers preferred embodiments generally in the order of their evolution with several intermediate embodiments and steps omitted completely. One of the biggest problems in developing the invention has been a key and matrix combination of materials and configurations that supports model parts with a sufficiently firm frictional grip to insure accuracy and still leaves the model parts free enough for convenient manual insertion and removal in the matrix. Later preferred embodiments afford an optimum solution to these problems, but all the preferred embodiments are closely related in concept and are retained herein since the proper co-efficient of friction for materials used could make any of them commercially attractive.

Figure 7:
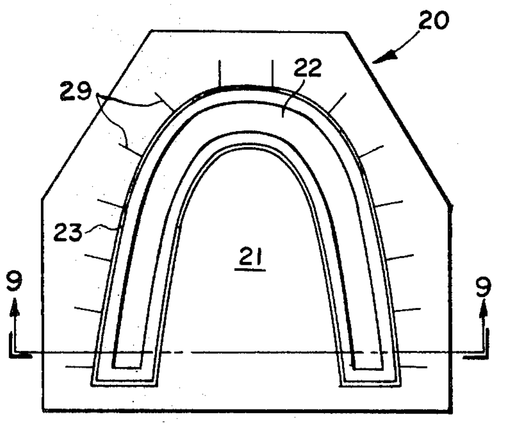
FIG. 7 is a top-plan view of an alternative keying device according to the invention.
Figure 8:
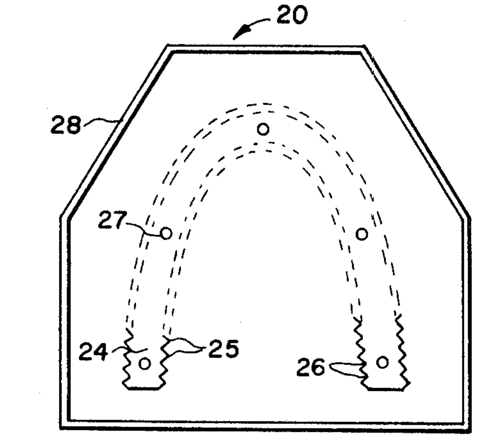
FIG. 8 is a bottom-plan view of the keying device of FIG. 7.
Figure 10:
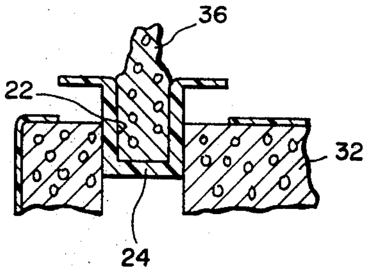
FIG. 10 is a thin fragment of the cross-section view of FIG. 9 with the addition of a cast keying matrix, a cast model, and showing partial removal of a model section from the keying matrix.
Figure 9:
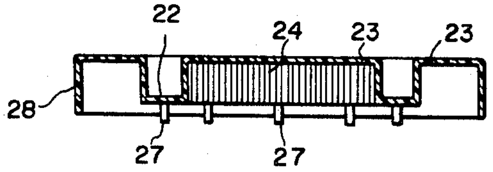
FIG. 9 is a cross-section view of the device of FIG. 7 taken along the line 9—9 thereof.

One preferred embodiment of a keying device according to the invention is shown in FIGS. 7–10. Keying device 20 has a generally flat base 21 the upper surface of which is formed to define an arch-shaped recess 22 surrounded by a line of weakness 23 in base 21. The walls forming recess 22 extend below the general plane of base 21 to provide a key 24 the outward facing surfaces of which are vertical and generally corrugated. Such corrugations are preferably formed of plane surfaces connected in alternate ridges 25 and grooves 26 as best shown in FIG. 8. A few knock-out projections 27 extends around the periphery of keying device 20 to surround key 24.

Figures 1, 2, 3:
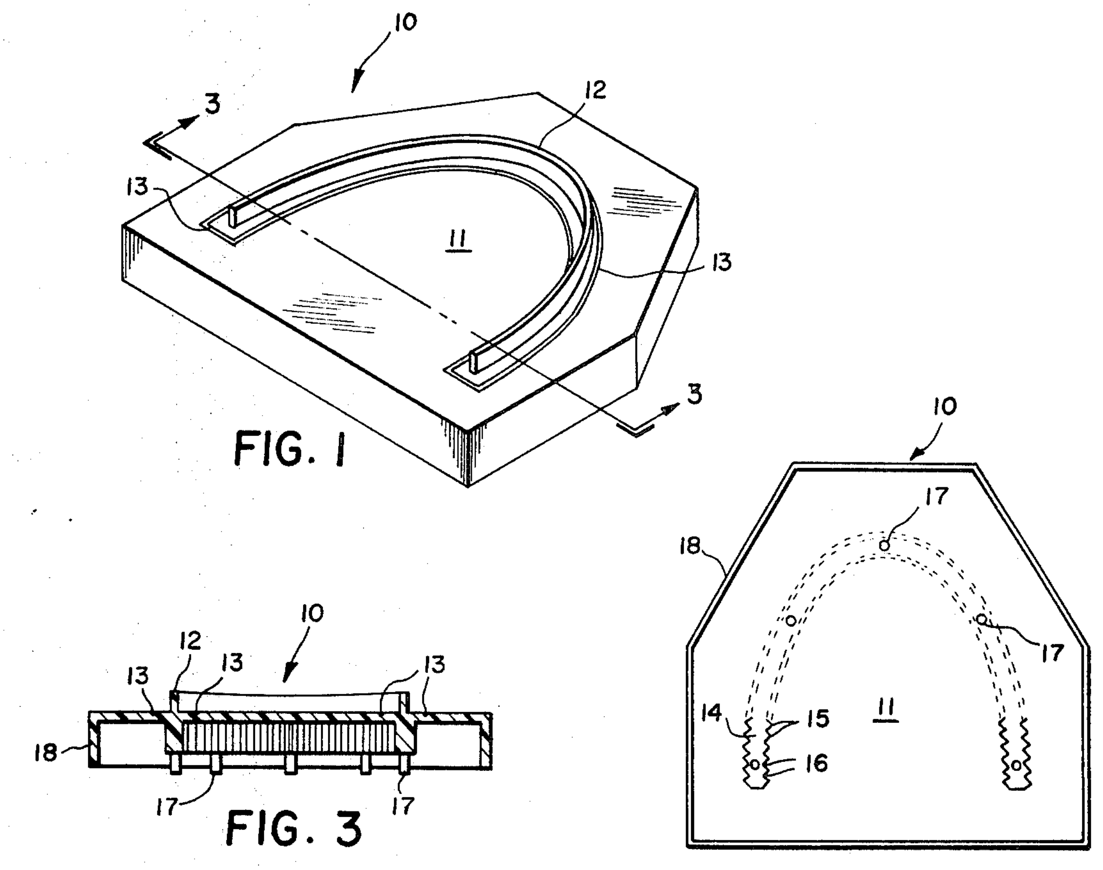
FIG. 1 is a perspective view of a preferred embodiment of a keying device according to the invention.
FIG. 2 is a bottom-plan view of the device of FIG. 1.
FIG. 3 is the cross-section view of the device of FIG. 1 taken along the line 3—3 thereof.

A later preferred embodiment of the inventive keying device is shown in FIGS. 1–6. Keying device 10 preferably molded of plastic material and formed with a generally flat base 11 having an arch-shaped ridge 12 extending above base 11, and a line of weakness 13 formed in base 11 around ridge 12. An arch-shaped key 14 extends below base 11 underneath ridge 12. The side walls of key 14 are vertical and generally corrugated. As best shown in FIG. 2 such corrugations are preferably formed by plane surfaces connected to form alternate ridges 15 and grooves 16 all of which are generally vertical and parallel with each other so that key 14 can be inserted and removed from a keying matrix as described below. A few knockout projections 17 extend below the general lower plane of key 14, and rim 18 extends around the perimeter of keying device 10 to surround key 14.

Figure 4:
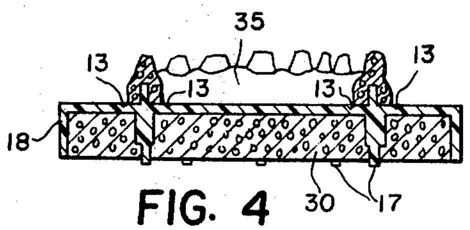
FIG. 4 is the cross-section view of FIG. 3 with the addition of a cast keying matrix and a keyed model.

In constructing a dental model by the inventive method, keying device 10 is oriented with key 14 upward as shown in FIG. 2, and a casting material (preferably "stone" material readily available in dental laboratories) is poured around key 14 to fill the area inside rim 18. Such casting material is allowed to set to form keying matrix 30 having a negative image of ridges 15 and grooves 16 to key 14. Knockout projections 17 are left extending beyond the surface of matrix 30 as shown in FIG. 4.

After keying matrix 30 has set, and preferably before the lapse of many days, key 14 and corresponding ridge 12 are separated from base 11 and rim 18 by cutting around line of weakness 13. Then by tapping on projections 17, key 14 is loosened and removed from matrix 30.

Figure 6:
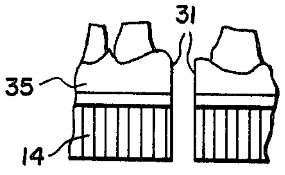
FIG. 6 is a fragmentary side elevation of a sectioned model keyed according to the invention.
Figure 5:
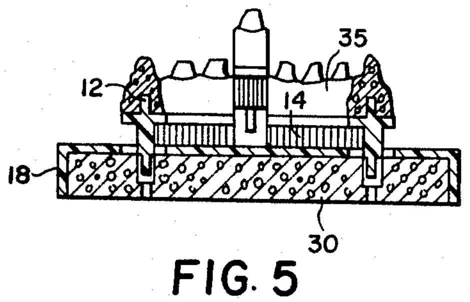
FIG. 5 is the cross-section view of FIG. 4 showing partial removal of the keyed model from the keying matrix.

Ridge 12 of key 14 is intended for bonding to a dental model. To accomplish this, casting material preferably of "stone" is poured into a negative impression of teeth in a generally known manner, and ridge 12 is inserted into the poured material before it sets. After the model casting sets, the model 35 is securely bonded to ridge 12 and is integral with key 14. Keyed model 35 is then removed from the tooth mold and appears as shown in FIG. 6 as a cast positive impression of teeth bonded to key 14. Model 35 is then cut or sectioned in vertical transverse planes such as shown by cut line 31 of FIG. 6 to separate teeth as desired for preparing a dental prosthesis. The separated parts of keyed model 35 are then inserted into or removed from matrix 30 as shown in FIGS. 4 and 5 during work on the model. The ridges and grooves of key 14 insure accurate location of each model section in matrix 30, and the vertical corrugated walls of key 14 allow insertion and removal of a model part, yet engage matrix 30 with sufficient frictional grip to hold a model part firmly in place whether in a lower jaw orientation such as shown in FIGS. 4 and 5, or an inverted upper jaw orientation.

Preferred refinements of the inventive method include removing projections 17 after key 14 has been removed from matrix 30, and trimming keyed model 35 after it has set so that it can be inserted into matrix 30 without any interference from casting material overhanging its periphery. Base 11 can also be trimmed around cut line 13.

Preferably, keyed model 35 is inserted into matrix 30 to test its fit and freedom from interference as a unit before being sectioned. Cutting or sectioning of model 35 is accomplished in any well-known way, and keying device 10 is preferably formed of an easily cut material for this purpose.

The surfaces of ridge 12 and the adjoining surfaces of base 11 within cut line 13 are preferably roughened or shaped to afford a secure bond to the model. Preferably, the top of ridge 12 is pressed with a heated surface to provide a slight outward flare affording an interlock with the model. Also, surfaces of ridge 12 are the area of base 11 within line of weakness 13 can be roughened. This is preferably accomplished by electrical or mechanical operations at the time of manufacture of keying device 10. For additional bonding security, ridge 12 can be scored or undercut before being inserted into a poured dental model.

To insure that the corrugations of a keyed model part cannot be inserted into matrix 30 in misregistration with their original position, ridges 15 are made irregular. Thus, preferably every third ridge 15 is sharply pointed, and all other ridges are slightly rounded. Of course, other irregularities can be used as convenient. Also, correct registration of model parts with the matrix base is preferably facilitated by location marks 29 such as shown in FIG. 7. Marks 29 are molded, embossed or otherwise formed in the upper surface of base 21 around the outside of the arch of the keying device. Pencil or other marks made on a finished model to align with location marks 29 before the model is sectioned afford a ready means for registering model parts in the base.

In constructing a dental model 36 using keying device 20, the procedure is similar in the casting of matrix 32 around key 24, preferably separating key 24 from the remainder of device 20 by cutting around line 23, and tapping key 24 from matrix 32. Then casting material is poured in excess into a negative impression of teeth, and channel 22 which affords the bonding impression of teeth, and channel 22 which affords the bonding surface for keying device 20 is placed over such poured material and pressed down so that model casting materials substantially fills channel 22. The inside surfaces of channel 22 are preferably roughened to afford a secure bond to the model. Model 36 and key 24 are then sectioned as desired and parts of keyed model 36 are inserted into and removed from keying matrix 32 as desired in further construction.

In using either keying device 10 or 20, it is preferred but not essential that the model bonding ridge 12 or channel 22 be cut away from the rest of the device along respective cut lines 13 and 23 before pressed into a poured dental model. The surfaces within cut line 13 around ridge 12 are preferably made narrow enough so that key 14 can be inserted well into a poured dental model inside a typical negative impression of teeth without interference with such impression.

The corrugated key surfaces securely hold model sections in place in a matrix no matter how the matrix is oriented. The matrix base, according to the invention, can be secured to an articulator in a generally known way such as by plastering, and model sections are conveniently retained in place and easily removed and reinserted accurately into place during articulation. To facilitate plastering of a matrix base to an articulator, an undercut can be molded into the matrix to afford a secure bond with the plaster.

Since upper and lower jaws generally differ slightly in arch curvature, the inventive keying device is preferably made in corresponding upper and lower jaw shapes. The height above the base of the bonding ridge 12 around upper and lower jaw arches also differs. For a lower jaw, ridge 12 is lower in the front central portion than at its extremities and the opposite is preferred for an upper jaw. Also, ridge 12 can be cut away to fit any particular model as required, before setting into the poured casting material.

Various adjustments are possible in effecting a practical compromise between molding of the inventive key and shaping it for effective keying to a matrix base. Any shrinking or undercutting of the plastic near the top of the key is to be avoided since this interferes with insertion and removal of the key from a matrix base. Also, the overall length of the key and its teeth relative to the depth of the matrix base are preferably balanced for optimum performance. Generally, the matrix base should be sufficiently thick for strength and support, the key should extend into the base to a sufficient depth to support the model accurately, there should be no mechanical interlock or interference between the key and the matrix base, and there should be sufficient friction between the key and the matrix base for holding the model in place in either lower or upper jaw orientation.

Figure 11:
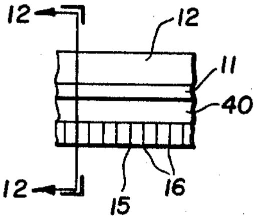
FIG. 11 is a fragmentary side elevation of an alternative tooth formation for the inventive keying device.
Figure 12:
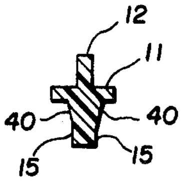
FIG. 12 is a cross section of the embodiment of FIG. 11 taken along the line 12—12 thereof.
Figure 13:
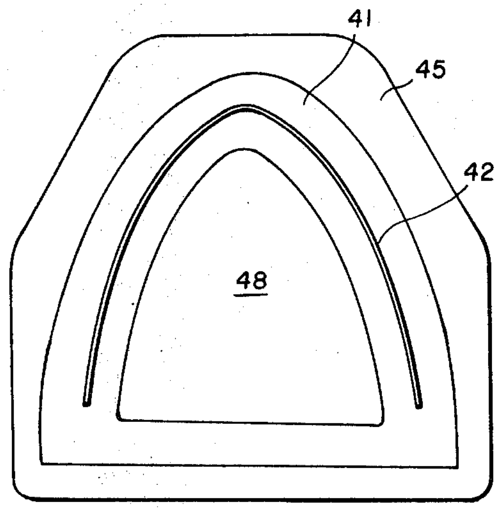
FIG. 13 is a plan view of another preferred embodiment of the inventive keying device.

The key illustrated in FIGS. 11 and 12 is similar to key 14 with modifications to effect a preferred working solution to such requirements. Ridge 12 extends above base 11, as previously described, and generally-plane draft surfaces 40 extend below base 11 to ridges 15 and grooves 16 forming the teeth of the key. Draft surfaces 40 prevent any undercutting of the key immediately below base 11 and thus prevent any interference in withdrawing the key from its matrix base. Ridges 15 and grooves 16 are formed at the bottom of the key for maximum insertion into a matrix base, and the key is of sufficient depth for accurate support in the base. Also, a base cast on such key is sufficiently thick for strength, and ridges 15 and grooves 16 extend vertically for a sufficient distance to afford secure support for a model. Of course, the required parameters can be balanced by other draft arrangements and other configurations of key surfaces.

Manufacturing tolerances for the inventive keying device need not be especially high, since each matrix is custom made to fit the exact shape of the particular key around which it is cast. The straight, vertical ridges and grooves of the corrugated key surfaces are preferred for their sure and accurate fitting within a matrix and their ease of cleaning. Bits of wax, stone, dust, or other particles inevitably fall on or attach to workpieces used in preparing dental prostheses, and these are easily removed from the preferred corrugated surfaces by a flat knife edge or a brush. However, the invention is not limited to a particular corrugation shape, and curved or rounded corrugations, square or rectangular faced corrugations, dovetail configurations, puzzle joint configurations, etc. all fall within the spirit of the invention.

For quarter jaws, quadrants, or other models of less than full jaw arch, a matrix can be cast in the usual way, the key removed, and then cut into sections of appropriate size for casting into the model. Several partial jaw models can be keyed into a single matrix if desired.

The invention uses a simple keying device that can be discarded after each use without undue expense. Also, model sectioning according to the invention is quick, easy, and does not require the careful planning that was necessary to fit dowel pins into every desired location during the casting process. In addition the inventive key and matrix parts are easier to connect, disconnect and keep clean.

The device of FIGS. 13–16 continues the general inventive concept of a casting ridge, a key, and a matrix for a dental model. The parts of this device are made separate to eliminate the need for cutting the key away from the matrix base. Key 41 includes the inventive casting ridge 42 and a corrugated key surface 43 and has a bridge 44 acting as a strengthening bar connecting the ends of the arch.

Figure 14:
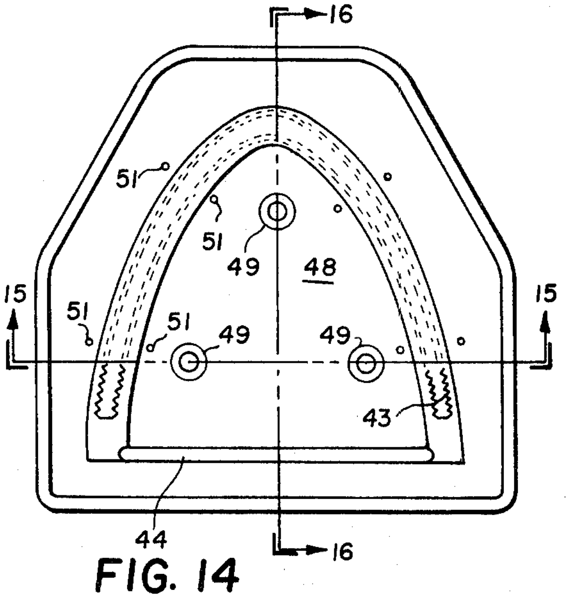
FIG. 14 is a bottom view of the device of FIG. 13.
Figure 15:
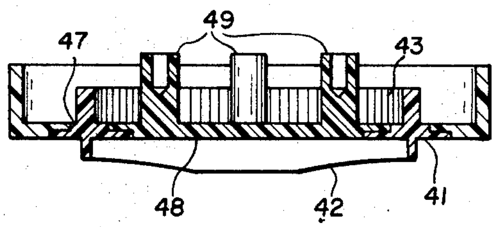
FIG. 15 is a cross section of the device of FIG. 14 taken along the line 15—15 thereof.
Figure 16:
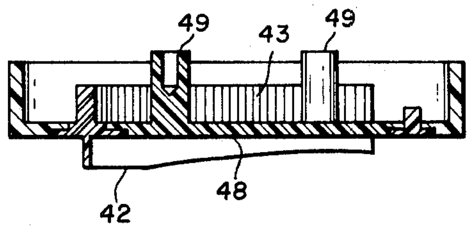
FIG. 16 is a cross section of the device of FIG. 14 taken along the line 16—16 thereof.

Matrix base 45 has a central opening in which key 41 is placed and a rim 46 for holding cast stone material. The abutting walls of key 41 and the matrix base 45 are mutually rabbeted as illustrated to ensure fitting of these parts together in proper orientation. An inner piece 48 is rabbeted to fit the edges of key 41 and placed inside the arch of key 41 to complete the closure of matrix base 45. Pins 51 on key 41 fit in holes in base 45 and inner piece 48 to locate the parts. When assembled and oriented as shown in FIG. 14, a stone matrix can be cast over the keying surface 43 of the device.

Knockout pins 49 extend from inner piece 48 above rim 46 so as to protrude beyond stone material cast in the matrix. Knockout pins 49 are socketed as illustrated to receive a three-footed punch (not shown) for driving the inner piece 48 and key 41 from the cast matrix. Casting ridge 42 is configured for an upper jaw in FIG. 15, and for a lower jaw in FIG. 16. Also, casting ridge 42 is preferably roughened or flared for an interlock with the model as described above.

Figure 17:
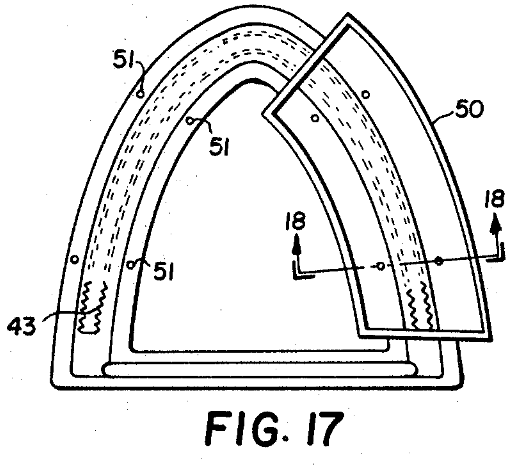
FIG. 17 is a plan view of a preferred embodiment of the inventive keying device equipped with a quadrant tray.
Figure 18:
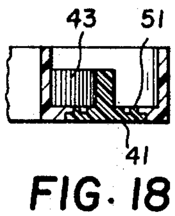
FIG. 18 is a cross section of the device of FIG. 17 taken along the line 18—18 thereof.

Key 41 is shown in use with a quadrant matrix tray 50 in FIGS. 17 and 18. Location pins 51 on key 41 cooperate with holes in quadrant tray 50 for proper location of tray 50 in a position straddling key surface 43 of key 41. Quadrant tray 50 is used with key 41 or a part of key 41 when only a partial arch or model is required, and a stone matrix is cast in tray 50 and surface 43 is pulled from the matrix in the same general way as described above.

Figure 19:
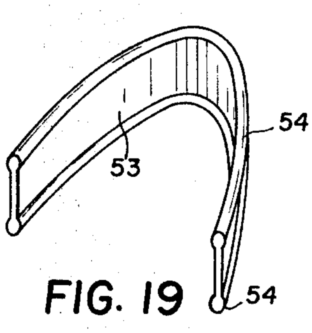
FIG. 19 is a perspective view of another preferred embodiment of the inventive keying device.
Figure 20:
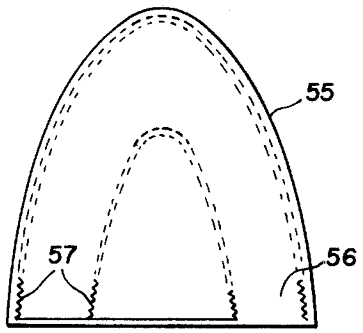
FIG. 20 is a plan view of a matrix tray for use with the keying device of FIG. 19.
Figure 21:
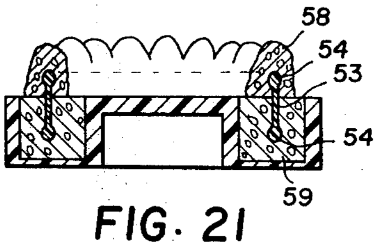
FIG. 21 is a cross section of a keyed model mounted in a matrix tray using the key of FIG. 19 and the tray of FIG. 20.

Another preferred embodiment of the inventive keying device is shown in FIGS. 19–21. Key 53 is formed in a general arched shape and has thickened or flared edges 54 for interlocking with a dental model 58 and cast key teeth 59. Mold 55 has a relatively wide recess 56 the sidewalls of which are formed with corrugations 57 for forming key teeth 59 according to the invention. Mold 55 is preferably a simple plastic tray that is re-usable, and key 53 is a simple plastic arch that is expended with each use.

In use, as illustrated in FIG. 21, one edge 54 of key 53 is cast into dental model 58, and then the opposite edge 54 of key 53 is cast into stone key surface 59 poured in recess 56 of matrix mold 55. Key 53 then forms an interlock between stone key surface 59 and model 58. Sectioned model parts can be inserted and removed from matrix mold 55 and properly aligned in corrugations 57 therein.

Figure 22:
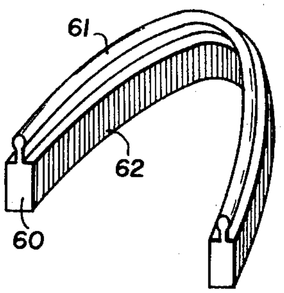
FIG. 22 is a perspective view of another preferred embodiment of a keying device according to the invention.
Figure 23:
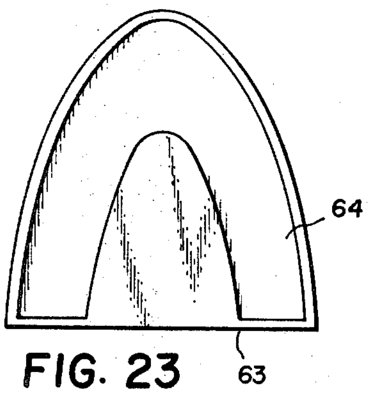
FIG. 23 is a plan view of a matrix tray for use with the keying device of FIG. 22.
Figure 24:
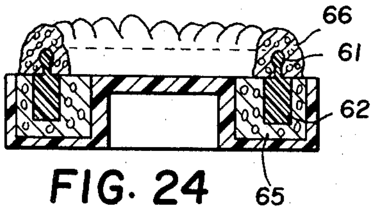
FIG. 24 is a cross section of a keyed model mounted in a matrix using the tray of FIG. 23 and the keying device of FIG. 22.
Figure 25:
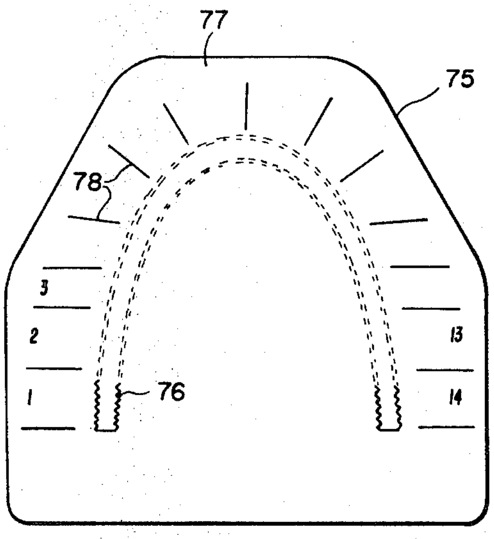
FIG. 25 is a plan view of the upper surface of a matrix base of a preferred embodiment of a matrix base according to the invention.

Key 60 of FIGS. 22–24 is similar to key 53 in having the inventive casting ridge 61 that is flared for an interlock with a model 66. An arch-shaped extension below ridge 61 has a corrugated key surface 62 for accurate fitting in a stone matrix 65.

The matrix 65 for key 60 is formed in reusable mold 63 having a smooth-walled, arch-shaped recess 64. After model 66 is cast on ridge 61, stone for matrix 65 is poured in recess 64, and keying surface 62 is inserted into the stone to cast martix 65 in a close fit to stone surface 62.

The device of FIGS,. 25–29 also follows the general teaching of the invention in providing a key 70 having a ridge 71 for interlocking with a cast stone model. Key 70 also includes a corrugated keying surface 72 extending below ridge 71, flange 73 surrounding ridge 71, and a bridge 74 connecting the ends of the arch of key 70.

A stone tooth model is cast on ridge 71 as previously described, and keying surface 72 is used to position sectioned model parts in a matrix as with other embodiments of the invention. However, instead of a stone matrix, a manufactured matrix base 75 receives keying surface 72 in a keying recess 76 corrugated to fit keying surface 72. Preferably, key 70 and matrix base 75 are each made from dies prepared from a master die to ensure an accurate fit. Matrix base 75 is reusable with a number of expendable keys 70 all of which fit accurately in keying recess 76.

Matrix base 75 and key 70 are preferably formed of different synthetic resins selected to provide optimum friction between key 70 and matrix base 75 for a firm, but easily releasable hold on model parts. Bridge 74 ensures that key 70 is not inadvertently changed in shape as it is cast into a model so that the keyed model will fit in keying recess 76. After the keyed model is cast and tested for its fit in keying recess 76, bridge 74 is cut away, and the model is trimmed to facilitate separation of model parts.

The upper surface 77 of matrix base 75 preferably has molded division lines 78 marking the normal boundaries between teeth of a dental arch. Numbers are also molded around upper surface 77 between division lines 78 to represent standard tooth numbers. The upper surface of flange 73 also bears division lines 79 that align with division lines 78 for convenient location of model parts in matrix base 75.

Figure 26:
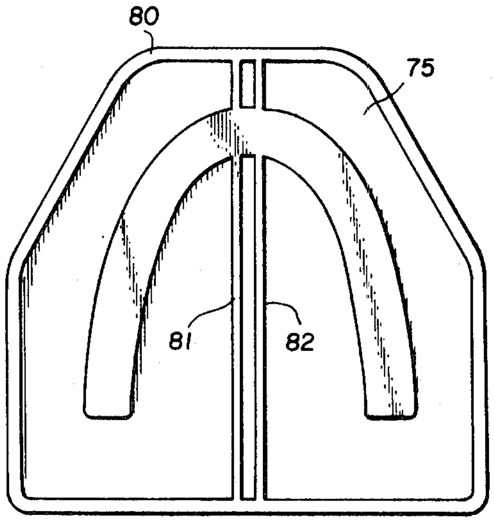
FIG. 26 is a plan view of the bottom of the matrix base of FIG. 25.
Figure 27:
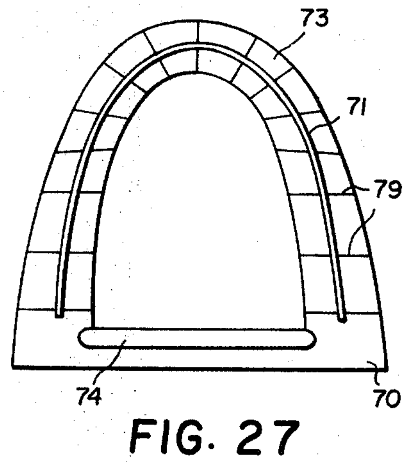
FIG. 27 is a plan view of the top of a keying device for use in the matrix base of FIGS. 25 and 26.
Figure 28:
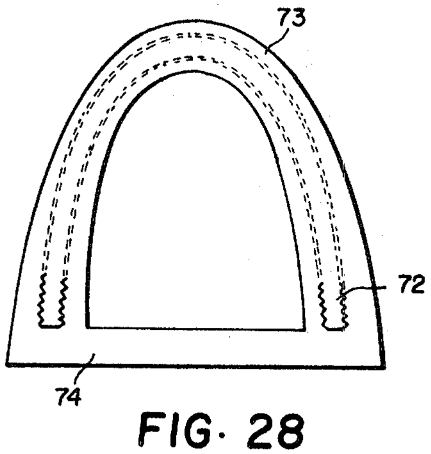
FIG. 28 is a plan view of the bottom of the keying device of FIG. 27.
Figure 29:
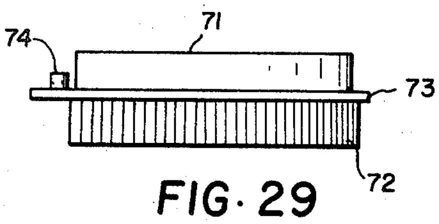
FIG. 29 is an elevational view of the keying device of FIG. 27.

The underside of matrix 75, as shown in FIG. 26, is preferably recessed and provided with a rim 80 to receive plaster for securing matrix base 75 to an articulator. Also, a pair of division walls 81 and 82 extend For example, with proper selection of materials and parameters, a variety of sizes and shapes for keying surfaces and matrices can be workable, and the various features of the described preferred embodiments can be interchanged and coordinated to form other devices falling within the spirit of the invention.

I claim:

1. A dental model keying device comprising:
(a) an arched ridge of material configured to extend into a cast dental model from the base thereof and to interlock with said dental model;
(b) a key carried by said ridge to lie outside the base of said model;
(c) said key having a keying surface that is vertical and generally corrugated;
(d) a matrix closely fitting said key and into which said key can be inserted and removed; and
(e) said key and said matrix being relatively dimensioned for a releasable friction-fit sufficient to hold keyed parts of said model from falling downward out of said matrix when said model is in an upper jaw orientation.

2. The keying device of claim 1 wherein said key comprises an arch-shaped projection extending below said ridge, and both side surfaces of said key are generally corrugated.

3. The keying device of claim 1 wherein said corrugated surface comprises a plurality of generally plane surfaces communicating in alternate ridges and grooves.

4. The keying device of claim 1 including material joining the ends of said arch of said ridge.

5. The device of claim 1 including material forming a generally plane surface extending outward around said ridge at the juncture of said ridge and said key.

6. The keying device of claim 1 wherein said ridge has roughened side surfaces.

7. The device of claim 1 wherein a top region of said ridge is thicker than the bottom region thereof.

8. The keying device of claim 1 including an outward flare at the top of said ridge.

9. The keying device of claim 1 wherein said key is formed of material cast on the bottom of said ridge to interlock with said ridge.

10. The keying device of claim 9 wherein said matrix comprises a base having a recess configured as a mold for casting said key.

11. The keying device of claim 1 wherein said matrix is formed of material cast on said key.

12. The keying device of claim 11 including a rimmed tray for holding said matrix casting material and means for disposing said key to extend into said casting material in said tray.

13. The keying device of claim 12 wherein said ridge and said key are formed integrally with said tray and wherein a line of weakness is formed in the material of said tray around said ridge for cutting away said ridge and said key from said tray.

14. The keying device of claim 13 wherein both side surfaces of said key are generally corrugated, said corrugated surface comprises a plurality of generally plane surfaces communicating in alternate ridges and grooves, and a plurality of projections extend from said key beyond 17. The keying device of claim 1 wherein said matrix comprises a base formed with a recess manufactured to fit said key.

18. The keying device of claim 17 wherein said matrix base and said key are formed of different synthetic resin materials.

19. The keying device of claim 17 wherein said matrix base includes a rim extending downward from the upper surface of said matrix base and a pair of spaced division walls extending below said upper surface of said matrix base within said rim and bisecting the arch of said recess.

20. The keying device of claim 17 including material joining the ends of said arch of said ridge.

21. The keying device of claim 20 including material forming a generally plane surface extending outward around said ridge at the juncture of said ridge and said key.

22. The keying device of claim 21 wherein said surface surrounding said ridge is marked in divisions to represent normal tooth spacing around said ridge, corresponding division marks are made on said upper surface of said matrix base, and tooth numbers are formed on said upper surface of said matrix base to correspond with said division marks.

23. The keying device of claim 21 wherein said corrugated surface comprises a plurality of generally plane surfaces communicating in alternating ridges and grooves, both side surfaces of said key are generally corrugated, and the top of said ridge has an outward flare.

References Cited

UNITED STATES PATENTS

| | | | |
|---|---|---|---|
| 2,618,063 | 11/1952 | Fournet | 32—11 |
| 3,478,428 | 11/1969 | Stengel | 32—11 |

ROBERT PESHOCK, Primary Examiner